3,091,598
POLY-α-OLEFINS CONTAINING THIOBISPHENOLS AND BUTYLATED HYDROXY TOLUENE
Frederick B. Joyner and Newton H. Shearer, Jr., Kingsport, Tenn., assignors to Eastman Kodak Company, Rochester, N.Y., a corporation of New Jersey
No Drawing. Filed Aug. 11, 1960, Ser. No. 48,809
12 Claims. (Cl. 260—45.95)

This invention relates to new poly-α-olefin compositions.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, often times expose the poly-α-olefin to elevated temperatures. To minimize oxidative deterioration in poly-α-olefins, antioxidants or stabilizers are often times incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel poly-α-olefin compositions containing synergistic combinations of compounds that improve the stability of the poly-α-olefin compositions against deterioration resulting from exposure to elevated temperatures.

Other objects of the invention will be apparent from the description and claims that follow.

The present invention comprises poly-α-olefin compositions having incorporated therein a stabilizer combination of 2,6-di-tertiary butyl-4-methylphenol and a thiobisphenol, 2,2'-thiobis(4-methyl-6-tertiary butylphenol) or 4,4'-thiobis(5-methyl-2-tertiary butylphenol).

The stabilizer components comprising the present synergistic combinations are well-known compounds.

The 2,6-di-tertiary butyl-4-methylphenol component is commonly called "butylated hydroxy toluene," or simply "BHT." For convenience of reference herein, the latter term is also used.

The combination of thiobisphenol and BHT can be used to stabilize a wide variety of solid poly-α-olefin compositions against deterioration resulting from exposure to elevated temperatures. Any of the normally solid polymers of α-monoolefinic hydrocarbons containing 2 to 12 carbon atoms can be stabilized in accordance with the invention. The subject stabilizer combinations can be used in the stabilization of such poly-α-olefins as polyethylene, polypropylene, poly(3-methylbutene-1), poly(4-methylpentene-1), poly(pentene-1), poly(3,3-dimethylbutene-1), poly(4,4-dimethylpentene-1), poly(octene-1), poly(decene-1), poly(3-cyclohexylbutene-1), polystyrene, poly(allylcyclohexane), poly(allylcyclopentane), poly(allylbenzene), poly(4-phenylbutene-1), poly(3-ethylheptene-1), poly(5-methylhexene-1) poly(6-methylheptene-1), poly(3-vinyl-2,2-dimethylnorcamphane), poly(3,5,5-trimethylhexene-1) and the like. Both the so-called "low density" and "high density" poly-α-olefin compositions can be stabilized in accordance with the invention. Reference is made to Fawcett et al. U.S. Patent No. 2,153,553, granted April 11, 1939, and to copending applications Coover et al. U.S. Serial No. 729,910, filed March 31, 1958, now abandoned, and Coover et al. U.S. Serial No. 724,904, filed March 31, 1958, now abandoned, with regard to the preparation of various poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 1,000 to 12,000.

The amount of the combination of the thiobisphenol and BHT employed in poly-α-olefin compositions in accordance with the invention can be widely varied, the stabilizing amount of this combination usually varying with the particular use to which the poly-α-olefin compositions are to be put. Concentrations of at least about .001% of each stabilizer component of the subject stabilizer combination are suitable, although about .001% to 5% for each stabilizer component are generally used, and with about .005% to 3% for each stabilizer component being preferred, the concentration being based on the weight of the poly-α-olefin. We generally utilize the combination of the subject stabilizers at a weight ratio of the thiobisphenol to BHT in the range of 1/100 to 100/1, and preferably 1/50 to 50/1.

The stabilizer combinations of the invention can be incorporated or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions. The subject additive have good compatibility with the subject poly-α-olefin substrates.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments, fibers and other shaped articles, including the widely used films or sheets of the polymers about .5 to 100 mils in thickness. The present compositions can be used for coating paper, wire, metal foil, glass fiber fabrics, synthetic and natural textiles or fabrics, and other such materials.

The stabilizer combinations of the subject thiobisphenols and BHT are synergistic combinations, namely, the stabilizing effect of such combinations in poly-α-olefins is substantially greater than the additive effect of the individual stabilizers of the combination.

Organic phosphites such as triphenyl phosphites, di(2-ethylhexyl) hydrogen phosphite, diphenyl hydrogen phosphite, mono(p-1,1,3,3-tetramethyl butylphenyl) phosphite, trilauryl phosphite and the like can be used in conjunction with the subject stabilizer combinations.

The invention is illustrated by the following examples of preferred embodiments thereof. In the following examples the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002 N sodium thiosulfate. The peroxide concentration, P, in milliequivalents per kilogram of polymer is given by the expression, $P = 8S$, where S is the number of milliliters of 0.002 N sodium thiosulfate used.

EXAMPLE 1

A 100 g. sample of powdered polypropylene having a density of 0.912, an inherent viscosity in tetralin at 145° C. of 3.15, and an oven storage life of less than one hour determined as described above was slurried with an acetone solution containing 0.075 g. of 2,6-di-tertiary butyl-4-methylphenol, 0.025 g. of 4,4'-thiobis(5-methyl-2-tertiary butylphenol) and 0.05 g. of trilauryl phosphite. The acetone was then allowed to evaporate leaving the additives substantially uniformly dispersed on the particles of polypropylene. The resulting mixture was homogenized by tumbling for 8 hours, molded into a plate and tested for stability by the oven storage test at 160° C. as described above. The oven storage life was determined to be 45 hours. Omitting the trilauryl phosphite did not substantially alter the oven life of the polypropylene. Omitting the 4,4'-thiobis(5-methyl-2-tertiary butylphenol) reduced the oven life to one hour, and omitting the 2,6-di-tertiary butyl-4-methylphenol reduced the oven life to 3 hours. The results are summarized by the data set out in Table 1 below.

Table 1

| Additive:[1] | Oven life at 160° C., Hours |
|---|---|
| (1) None | <1 |
| (2) 0.075% BHT | 1 |
| (3) 0.025% 4,4'-thiobis(5-methyl-2-tertiary butylphenol) | 3 |
| (4) 0.025% 4,4'-thiobis (5-methyl-2-tertiary butylphenol) +0.075 BHT | 45 |

[1] A 0.05% portion of trilauryl phosphite was also present.

As can be observed from the data set out in Table 1 above, the combination of BHT and 4,4'-thiobis(5-methyl-2-tertiary butylphenol) is a synergistic combination with respect to the stabilization of polypropylene, the stabilizing effect of this combination being substantially greater than the additive stabilizing effect of the components of this combination. Similar synergism is demonstrated if 2,2'-thiobis(4-methyl-6-tertiary butylphenol) is substituted for the 4,4'-thiobis(5-methyl-2-tertiary butylphenol).

EXAMPLE 2

Several poly-α-olefins containing the synergistic stabilizer combinations of the invention were tested for stability by the oven storage test at 160° C. as described above and in Example 1. Samples of poly-α-olefins containing no additive and only one of the stabilizer components of the subject stabilizer combinations were included for comparative purposes. The poly-α-olefins tested were: solid polyethylene having an average molecular weight of about 15,000 and a density of about .95; solid polypropylene having an average molecular weight of about 25,000 and a density of about .912; solid poly(3-methylpentene-1) having an average molecular weight of about 15,000 and a density of about .90; solid poly(4-methylpentene-1) having an average molecular weight of about 15,000 and a density of about .83; and solid poly(3,3,5-trimethylhexene-1) having an average molecular weight of about 12,000. The results of the stability tests are summarized by the data set out in Table 2 below. In Table 2, the concentrations are based on the weight of the poly-α-olefin.

Table 2

| | Poly-α-olefin | Additive, Conc. in percent | | | Oven Life at 160° C., Hours |
|---|---|---|---|---|---|
| | | A[1] | B[2] | C[3] | |
| (1) | Polyethylene | 0 | 0 | 0 | <1 |
| (2) | do | 0 | 0 | 0.05 | <5 |
| (3) | do | 0 | 0.05 | 0 | 23 |
| (4) | do | 0 | 0.05 | 0.05 | 51 |
| (5) | do | 0 | 0.1 | 1.0 | >100 |
| (6) | do | 1.0 | 0 | 0.033 | >100 |
| (7) | Polypropylene | 0 | 0 | 0 | 1 |
| (8) | do | 0 | 0 | 0.001 | <0.2 |
| (9) | do | 0.004 | 0 | 0 | 0.5 |
| (10) | do | 0.004 | 0 | 0.001 | 1.5 |
| (11) | do | 0 | 0.025 | 0 | 3.5 |
| (12) | do | 0 | 0.025 | 0.075 | 44 |
| (13) | do | 0 | 0 | 2.9 | 21 |
| (14) | do | 0.1 | 0 | 0 | 41 |
| (15) | do | 0.1 | 0 | 2.9 | >100 |
| (16) | Poly(4-methylpentene-1) | 0 | 0 | 0 | <1 |
| (17) | do | 0 | 0 | 0.01 | 0.2 |
| (18) | do | 0 | 0.1 | 0 | 41 |
| (19) | do | 0 | 0.1 | 0.01 | 49 |
| (20) | Poly(3-methylbutene-1) | 0 | 0 | 0 | <1 |
| (21) | do | 0.01 | 0 | 0 | <1 |
| (22) | do | 0 | 0 | 0.19 | <2 |
| (23) | do | 0.01 | 0 | 0.19 | 15 |
| (24) | Poly(3,5,5-trimethylhexene-1) | 0 | 0 | 0 | <1 |
| (25) | do | 0 | 0 | 0.5 | 3 |
| (26) | do | 0.3 | 0 | 0 | 57 |
| (27) | do | 0.3 | 0 | 0.5 | >200 |
| (28) | do | 0 | 0 | 0.3 | 2 |
| (29) | do | 0 | 0.1 | 0 | 36 |
| (30) | do | 0 | 0.1 | 0.3 | 140 |

[1] Additive A is 4,4'-thiobis(5-methyl-2-tertiary butylphenol).
[2] Additive B is 2,2'-thiobis(4-methyl-6-tertiary butylphenol).
[3] Additive C is 2,6-di-tertiary butyl-4-methylphenol (BHT).

As can be observed from the data set out in Table 2 above, the stabilizer combinations of the invention are effective synergistic stabilizer combinations for a wide variety of poly-α-olefins.

The present invention thus provides novel poly-α-olefin compositions having improved stability against deterioration resulting from exposure to elevated temperatures, and particularly, it provides novel synergistic stabilizer combinations for poly-α-olefin compositons.

Although the invention has been described in detail with reference to preferred embodiments thereof, it will be understood that variations and modifications can be effected within the spirit and scope of the invention as described hereinabove and as defined by the appended claims.

The poly(3,5,5-trimethylpentene-1) referred to above can be prepared by the method described in copending application by Wicker et al., entitled "Polymers of 3,5-Dimethyl and 3,5,5-Trimethyl-1-Hexene," U.S. Serial No. 48,852, filed concurrently herewith.

We claim:

1. A solid poly-α-olefin composition comprising a solid poly-α-olefin prepared from an α-olefinic hydrocarbon having 2 to 12 carbon atoms containing a stabilizer combination comprising at least about .0001% by weight based on said poly-α-olefin of 2,6-di-tertiary butyl-4-methylphenol and at least about .001% by weight based on said poly-α-olefin of a thiobisphenol selected from the group consisting of 2,2'-thiobis(4-methyl-6-tertiary butylphenol) and 4,4'-thiobis(5-methyl-2-tertiary butylphenol).

2. A solid poly-α-olefin composition comprising a solid poly-α-olefin selected from the group consisting of polyethylene, polypropylene, poly(4-methylpentene-1), poly (3-methylbutene-1) and poly(3,5,5-trimethylhexene-1) containing a stabilizer combination comprising about .001% to 5% by weight based on said poly-α-olefin of 2,6-di-tertiary butyl-4-methylphenol and about .001% to 5% by weight based on said poly-α-olefin of a thiobisphenol selected from the group consisting of 2,2'-thiobis(4-methyl-6-tertiary butylphenol) and 4,4'-thiobis(5-methyl-2-tertiary butylphenol).

3. A solid poly-α-olefin composition comprising solid polyethylene containing a stabilizer combination comprising about .005% to 3% by weight based on said polyethylene of 2,6 - di - tertiary butyl - 4 - methylphenol and about .005% to 3% by weight based on said polyethylene of 2,2'-thiobis(4-methyl-6-tertiary butylphenol).

4. A solid poly-α-olefin composition comprising solid polyethylene containing a stabilizer combination comprising about .005% to 3% by weight based on said polyethylene of 2,6-di-tertiary butyl-4-methylphenol and about .005% to 3% by weight based on said polyethylene of 4,4'-thiobis(5-methyl-2-tertiary butylphenol).

5. A solid poly-α-olefin composition comprising solid polypropylene containing a stabilizer combination comprising about .005% to 3% by weight based on said polypropylene of 2,6-di-tertiary butyl-4-methylphenol and about .005% to 3% by weight based on said polypropylene of 2,2'-thiobis(4-methyl-6-tertiary butylphenol).

6. A solid poly-α-olefin composition comprising solid polypropylene containing a stabilizer combination comprising about .005% to 3% by weight based on said polypropylene of 2,6-di-tertiary butyl-4-methylphenol and about .005% to 3% by weight based on said polypropylene of 4,4'-thiobis(5-methyl-2-tertiary butylphenol).

7. A solid poly-α-olefin composition comprising solid poly(4-methylpentene-1) containing a stabilizer combination comprising about .005% to 3% by weight based on said poly(4-methylpentene-1) of 2,6-di-tertiary butyl-4-methylphenol and about .005% to 3% by weight based on said poly(4-methylpentene-1) of 2,2'-thiobis(4-methyl-6-tertiary butylphenol).

8. A solid poly-α-olefin composition comprising solid poly(4-methylpentene-1) containing a stabilizer combination comprising about .005% to 3% by weight based on said poly(4-methylpentene-1) of 2,6-di-tertiary butyl-4-methylphenol and about .005% to 3% by weight based on poly(4-methylpentene-1) of 4,4'-thiobis(5-methyl-2-tertiary butylphenol).

9. A solid poly-α-olefin composition comprising solid poly(3-methylbutene-1) containing a stabilizer combination comprising about .005% to 3% by weight based on said poly(3-methylbutene-1) of 2,6-di-tertiary butyl-4-methylphenol and about .005% to 3% by weight based on said poly(3-methylbutene-1) of 2,2'-thiobis(4-methyl-6-tertiary butylphenol).

10. A solid poly-α-olefin composition comprising solid poly(3-methylbutene-1) containing a stabilizer combination comprising about .005% to 3% by weight based on said poly(3-methylbutene-1) of 2,6-di-tertiary butyl-4-methylphenol and about .005% to 3% by weight based on said poly(3-methylbutene-1) of 4,4'-thiobis(5-methyl-2-tertiary butylphenol).

11. A solid poly-α-olefin composition comprising solid poly(3,5,5 - trimethylhexene - 1) containing a stabilizer combination comprising about .005% to 3% by weight based on said poly(3,5,5-trimethylhexene-1) of 2,6-di-tertiary butyl-4-methylphenol and about .005% to 3% by weight based on said poly(3,5,5-trimethylhexene-1) of 2,2'-thiobis(4-methyl-6-tertiary butylphenol).

12. A solid poly-α-olefin composition comprising solid poly(3,5,5 - trimethylhexene - 1) containing a stabilizer combination comprising about .005% to 3% by weight based on said poly(3,5,5-trimethylhexene-1) of 2,6-di-tertiary butyl-4-methylphenol and about .005% to 3% by weight based on said poly(3,5,5-trimethylhexene-1) of 4,4'-thiobis(5-methyl-2-tertiary butylphenol).

References Cited in the file of this patent

UNITED STATES PATENTS

| | | |
|---|---|---|
| 2,985,617 | Salyer et al. | May 23, 1961 |
| 3,000,854 | Favre | Sept. 19, 1961 |

FOREIGN PATENTS

| | | |
|---|---|---|
| 201,160 | Australia | Jan. 11, 1956 |
| 1,171,286 | France | Sept. 29, 1958 |

OTHER REFERENCES

Chevassus et al.: "La Stabilisation des Chlorures de Polyvinyle," Amphora, Paris, publishers (1957), p. 129.